US012798464B2

(12) United States Patent
Laverack

(10) Patent No.: US 12,798,464 B2
(45) Date of Patent: Nov. 17, 2026

(54) TRAILER-MOUNTED GRAIN VACUUM DEVICE

(71) Applicant: Tony Laverack, Funk, NE (US)

(72) Inventor: Tony Laverack, Funk, NE (US)

( * ) Notice: Subject to any disclaimer, the term of this patent is extended or adjusted under 35 U.S.C. 154(b) by 508 days.

(21) Appl. No.: 18/489,137

(22) Filed: Oct. 18, 2023

(65) Prior Publication Data

US 2025/0042322 A1 Feb. 6, 2025

Related U.S. Application Data

(60) Provisional application No. 63/529,801, filed on Jul. 31, 2023.

(51) Int. Cl.

| | |
|---|---|
| ***B60P 1/60*** | (2006.01) |
| ***B60P 3/22*** | (2006.01) |
| *A47L 5/22* | (2006.01) |
| *A47L 9/28* | (2006.01) |

(52) U.S. Cl.

CPC ............... *B60P 1/60* (2013.01); *B60P 3/2245* (2013.01); *A47L 5/22* (2013.01); *A47L 9/2842* (2013.01)

(58) Field of Classification Search

CPC ........ B60P 1/60; B60P 3/2245; A47L 9/2842; A47L 5/22

See application file for complete search history.

(56) References Cited

U.S. PATENT DOCUMENTS

| | | | | |
|---|---|---|---|---|
| 3,669,145 A * | 6/1972 | Holstrom | A47L 9/2857 | 137/565.33 |
| 5,507,067 A * | 4/1996 | Hoekstra | A47L 9/2857 | 15/319 |
| 2007/0089262 A1* | 4/2007 | Drevitson | A47L 5/14 | 15/353 |
| 2010/0229334 A1* | 9/2010 | Conrad | A47L 9/009 | 15/353 |
| 2016/0100724 A1* | 4/2016 | Valentini | A47L 9/2836 | 15/319 |
| 2022/0097236 A1* | 3/2022 | Bellinger | A47L 9/2852 | |

* cited by examiner

*Primary Examiner* — Andrew A Horton
(74) *Attorney, Agent, or Firm* — Brennan, Manna & Diamond, LLC

(57) ABSTRACT

A trailer-mounted vacuum device for vacuuming grains. The device is securely mounted on a trailer and features a power generator for generating electrical power, an air compressor generating pressurized airflow for efficient vacuum creation, and a hydraulic hoist for flexible vacuum drum positioning. A vacuum drum, constructed from durable materials, stores grains under controlled vacuum conditions. A monitoring module regulates pressure levels within an embedded air storage tank and the vacuum drum, optimizing grain vacuuming effectiveness. Different options offered by the monitoring module enable automatic pressure adjustments for vacuuming loose, denser, or clogged grains. The innovative device streamlines grain collection, supports sustainable farming, and ensures efficient transportability.

16 Claims, 5 Drawing Sheets

TRAILER-MOUNTED GRAIN VACUUM DEVICE

CROSS-REFERENCE TO RELATED APPLICATION

The present application claims priority to, and the benefit of, U.S. Provisional Application No. 63/529,801, which was filed on Jul. 31, 2023, and is incorporated herein by reference in its entirety.

FIELD OF THE INVENTION

The present invention generally relates to the field of vacuum devices. More specifically, the present invention relates to a novel vacuum device that can be used to vacuum loose and clogged grain. The device includes a trailer-mounted vacuum device with a power generator, an air compressor, a hydraulic hoist, and a vacuum drum/tank system. Accordingly, the present disclosure makes specific reference thereto. Nonetheless, it is to be appreciated that aspects of the present invention are also equally applicable to other like applications, devices, and methods of manufacture.

BACKGROUND

By way of background, farming involves the cultivation of crops, including grains like wheat, rice, corn, barley, and more. The grains are harvested and used for different purposes, such as food production, livestock feed, and more. However, during the process of harvesting, transporting, and storing the grains, spillage can occur. During harvesting, grains are spilled when the combine harvester is not properly adjusted, or when the grains are wet and slippery. Grains are spilled during transportation if the truck or trailer is not properly loaded or secured. Grain can also be spilled during storage if the bins or silos are not properly designed or maintained.

When the grains are spilled, they are scattered and are difficult to pick up. Unlike larger objects, grains are tiny and can easily scatter over a wide area, making it hard for a user to collect the spilled grains efficiently. Further, picking up spilled grains is laborious and time consuming. A person must bend and sit on their knees to pick up spilled grains. The labor and time required to manually pick up every grain along with the inability to effectively retrieve spilled grains leads to a direct loss of profits for farmers. Spilled grains on the ground also attract rodents, such as mice and rats. Rodents can consume even more grain, and damage crops, equipment, and storage structures, further exacerbating the financial loss. Rodents can also spread diseases that affect both humans and other animals. Individuals desire a device that can easily clean and collect spilled grains overcoming the problems in prior art.

Therefore, there exists a long-felt need in the art for a device for cleaning up spilled grains. Additionally, there is a long-felt need in the art for a vacuum device that can be used to vacuum spilled grain. Moreover, there is a long-felt need in the art for a vacuum device for vacuuming and collecting spilled grains. Further, there is a long-felt need in the art for a grain vacuum device that can be towed on a trailer for easy mobility and transportation. Furthermore, there is a long-felt need in the art for a specialized vacuum apparatus for cleaning up spilled grain, coupled with the concurrent requirement for mobility and trailer compatibility. Finally, there is a long-felt need in the art for a novel vacuum device that improves the efficiency, profitability, and sustainability of farming practices by mitigating and vacuuming grain losses.

The subject matter disclosed and claimed herein, in one embodiment thereof, comprises a trailer-mounted vacuum device designed to efficiently vacuum both loose and clogged grains. The vacuum device is permanently or temporarily affixed to a trailer to enhance the mobility of the vacuum device. The vacuum device includes a power generator for generating electrical power for the functioning of the vacuum device, an air compressor for generating pressurized airflow for vacuuming wherein the airflow is stored in an air tank, and a hydraulic hoist for adaptable positioning of a vacuum drum. The vacuum drum efficiently stores grains under a controlled vacuum, facilitated by an embedded air storage tank which is coupled to the air compressor. A monitoring module monitors the vacuum device and provides optimal pressure release, for effective grain vacuuming. The vacuum drum provides a vacuum storage for the grains and a flexible pipe is used for sucking and collecting loose grains.

In this manner, the trailer-mounted vacuum device of the present invention accomplishes all of the foregoing objectives and provides users with a vacuum device that is used for cleaning up spilled and loose grains. The device provides easy transportation and can be used anywhere to collect grains. The device makes the process of collecting grains easy and stores them in a vacuum storage, thereby preventing spoilage of the grains.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a trailer-mounted vacuum device designed to efficiently vacuum both loose and clogged grains. The vacuum device is affixed to a trailer to enhance mobility thereof. The vacuum device includes a power generator for generating electrical power, an air compressor for generating pressurized airflow for vacuuming, and a hydraulic hoist for adaptable positioning of a vacuum drum. The vacuum drum efficiently stores grains under a controlled vacuum, facilitated by an embedded air storage tank which is coupled to the air compressor. A monitoring module monitors the vacuum device and provides optimal pressure release, for effective grain vacuuming.

In another embodiment, the monitoring module provides a “Loose grains” option programmed to automatically provide pressure within a range of 70 to 240 millibars (mbar), facilitating efficient vacuuming of light grains such as rice and oats. A “Denser grains” option programmed to automatically provide pressure within a range of 240 to 480 millibars (mbar), optimizing vacuuming for grains including corn, barley, and soybeans. A “Clogged grains” option programmed to automatically provide pressure within a range of 320 to 580 millibars (mbar), enabling effective vacuuming of clogged grains.

In yet another embodiment, a trailer-mounted vacuum device for efficiently vacuuming both loose and clogged grains is disclosed. The vacuum device is mounted onto a trailer to facilitate improved mobility and transportability, the trailer being adaptable for use as a conventional farming trailer or a specially designed flatbed trailer. The device includes a power generator adapted to provide electrical power, an air compressor configured to generate pressurized airflow for creating a vacuum effect within the vacuum device, the high-pressure airflow from the air compressor inducing a suction force facilitating the collection of grains into a vacuum drum or tank. An embedded air storage tank is integrated with the air compressor to accumulate high-pressure airflow, the air storage tank facilitates the generation of the high-pressure airflow for the vacuum effect. A hydraulic hoist is configured for lifting and positioning a vacuum drum or tank, the hydraulic hoist provides adjustability of height and angle for accommodating diverse grain collection scenarios. The vacuum drum or tank is configured for storing collected grains and generating a vacuum therein. A flexible vacuum pipe in communication with the vacuum drum or tank, the flexible vacuum pipe is adapted for efficiently collecting and conveying grains into the vacuum drum or tank.

Numerous benefits and advantages of this invention will become apparent to those skilled in the art to which it pertains upon reading and understanding of the following detailed specifications.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
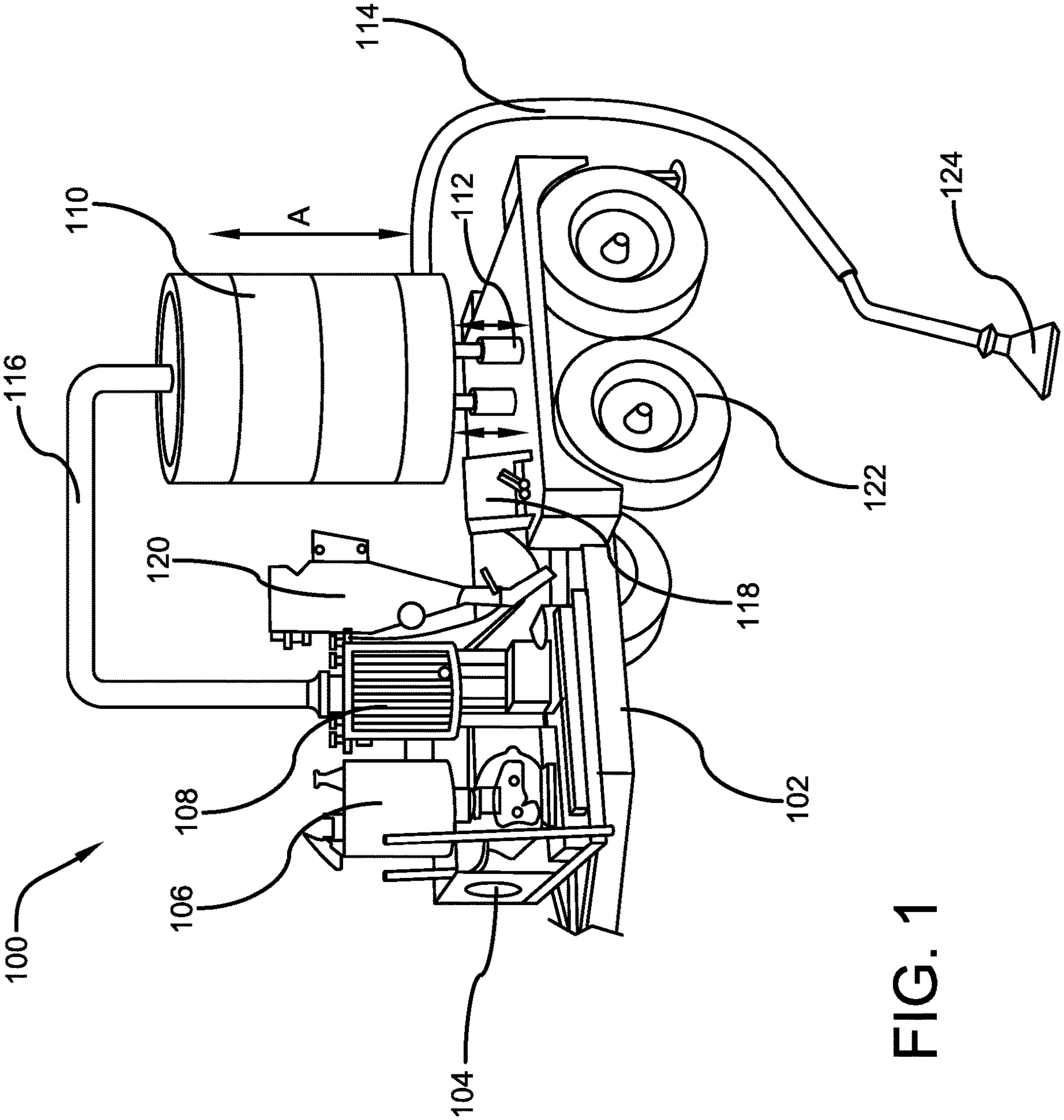
FIG. 1 illustrates a perspective view of a trailer-mounted loose grain vacuum device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a device for cleaning up spilled grains. Additionally, there is a long-felt need in the art for a vacuum device that can be used to vacuum spilled grain. Moreover, there is a long-felt need in the art for a vacuum device for vacuuming and collecting spilled grains. Further, there is a long-felt need in the art for a grain vacuum device that can be towed on a trailer for easy mobility and transportation. Furthermore, there is a long-felt need in the art for a specialized vacuum apparatus for cleaning up spilled grain, coupled with the concurrent requirement for mobility and trailer compatibility. Finally, there is a long-felt need in the art for a novel vacuum device that improves the efficiency, profitability, and sustainability of farming practices by mitigating and vacuuming grain losses.

The present invention, in one exemplary embodiment, is a trailer-mounted vacuum device for efficiently vacuuming both loose and clogged grains. The vacuum device is mounted onto a trailer to facilitate improved mobility and transportability, the trailer being adaptable for use as a conventional farming trailer or a specially designed flatbed trailer. The device includes a power generator adapted to provide electrical power, and an air compressor configured to generate pressurized airflow. An embedded air storage tank is integrated with the air compressor to accumulate high-pressure airflow, the air storage tank facilitates the generation of the high-pressure airflow for the vacuum effect. A hydraulic hoist is configured for lifting and positioning a vacuum drum or tank, the hydraulic hoist provides adjustability of height and angle for accommodating diverse grain collection scenarios. The vacuum drum or tank is configured for storing collected grains and generating a vacuum therein. A flexible vacuum pipe in communication with the vacuum drum or tank, the flexible vacuum pipe is adapted for efficiently collecting and conveying grains into the vacuum drum or tank.

Referring initially to the drawings, FIG. 1 illustrates a perspective view of a trailer-mounted loose-grain vacuum device of the present invention in accordance with the disclosed architecture. The trailer-mounted vacuum device 100 of the present invention is designed to perform the task of vacuuming both loose and clogged grain efficiently to improve the efficiency, profitability, and sustainability of farming practices. More specifically, the vacuum device 100 is mounted onto a trailer 102 to improve mobility and transportability of the device 100. The trailer 102 can be any type of conventional trailer used in farming or can also be a specially designed flatbed trailer. Further, the vacuum device 100 can be permanently or temporarily mounted onto the trailer 102.

A power generator 104 is integrated with the vacuum device 100 and is used for providing the electrical power to run different components of the vacuum device 100. The power generator 104 can be one of gasoline generator, diesel generator, propane generator, natural gas generator, solar generator, wind generator, or any other clean fuel generator. It will be apparent to a person skilled in the art that the selection of the type of power generator 104 is based on power requirements, fuel availability, budget, and emissions regulations.

An air compressor 106 is used for creating pressurized airflow for creating a vacuum effect in the vacuum device 100. The high-pressure airflow generated by the air compressor creates a suction force that pulls grains into the vacuum drum/tank 110. An embedded air storage tank 108 is used in the air compressor 106 for generating high-pressure airflow. A hydraulic hoist 112 is included in the vacuum device 100 for lifting and positioning the vacuum drum/tank 110 (as shown by arrow "A"). The hydraulic hoist 112 provides flexibility in adjusting the height and angle of the vacuum device 100 to accommodate different grain collection scenarios.

The vacuum drum 110 is designed to store the collected grains while also creating the vacuum required for the storage of the grains. The vacuum drum 110 is constructed from a material that can withstand the pressure differentials and handling of grains. A flexible vacuum pipe 114 is used with the vacuum drum 110 for collecting the grains for storing in the vacuum drum 110.

The vacuum drum 110 provides a sealed chamber within which the collected grains are stored. The pressure inside the vacuum drum 110 is lower than the surrounding atmosphere that creates a vacuum effect to facilitate the movement of loose grains into the drum and prevents contamination or spoilage. More specifically, when the air compressor 106 operates, the air compressor 106 pumps air into the embedded air storage tank 108. The air is stored under pressure in air storage tank 108, and the energy of the stored air is used to create the vacuum effect inside the drum 110 wherein the stored air is used for creating a suction along the pipe 116. The vacuum effect facilitates the efficient collection of grains, including those that are loose or clogged.

A hoist pedal 118 is provided in the present embodiment of the vacuum device 100 for enabling a user to push the pedal 118 electronically or manually to vertically adjust the drum 110. In some embodiments of the present invention, the hoist 112 can be used to support the complete vacuum device 100 and can vertically adjust the vacuum device 100. A pressure monitoring module 120 monitors the pressure level inside the air tank 108 and vacuum drum 110 and is integrated in the vacuum device 100. The module 120 controls the release of the air at a specific or predetermined pressure level for an effective grain vacuuming process.

The trailer 102 provides easy transportation and maneuverability to the vacuum device 100 and the wheels 122 can carry the device 100 at any location. The flexible pipe 114 can reach difficult places and collect loose grains easily without requiring a user to awkwardly maneuver their body. The suction end 124 collects the grains and the collected grains are stored inside the drum 110.

Figure 2:
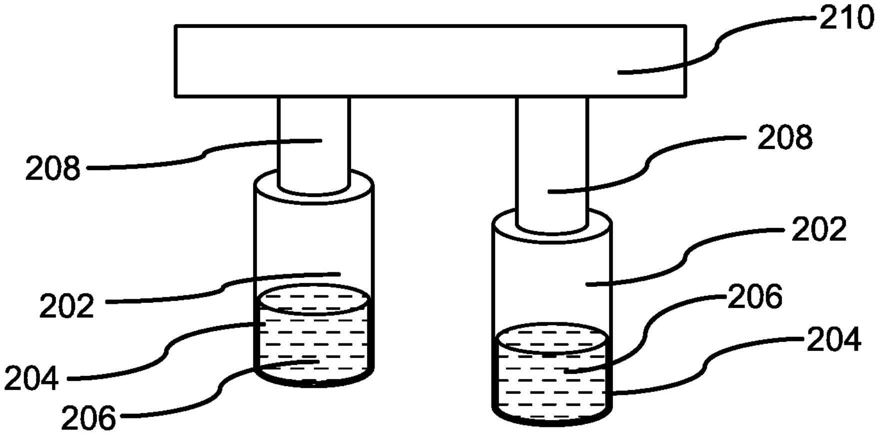
FIG. 2 illustrates an enlarged view of the hydraulic hoist of the vacuum device of the present invention in accordance with the disclosed structure.

FIG. 2 illustrates an enlarged view of the hydraulic hoist 112 of the vacuum device 100 of the present invention in accordance with the disclosed structure. The hoist 112 includes hydraulic cylinders 202 which includes a piston and rod assembly. Each hydraulic cylinder 202 includes a hydraulic reservoir 204 configured to hold hydraulic fluid 206 which is used to transmit pressure to the hydraulic cylinder 202. Linkage elements 208 are associated with the hydraulic cylinders 202 which convert the linear motion of the hydraulic cylinders 202 into the vertical lifting motion of the platform 210 on which the drum 110 is placed as illustrated in FIG. 1. The hydraulic hoist 112 provides flexibility by enabling adjustments to the height and angle of the vacuum drum 110, enabling the device 100 to adapt to different grain collection scenarios and transport positions.

Figure 3:
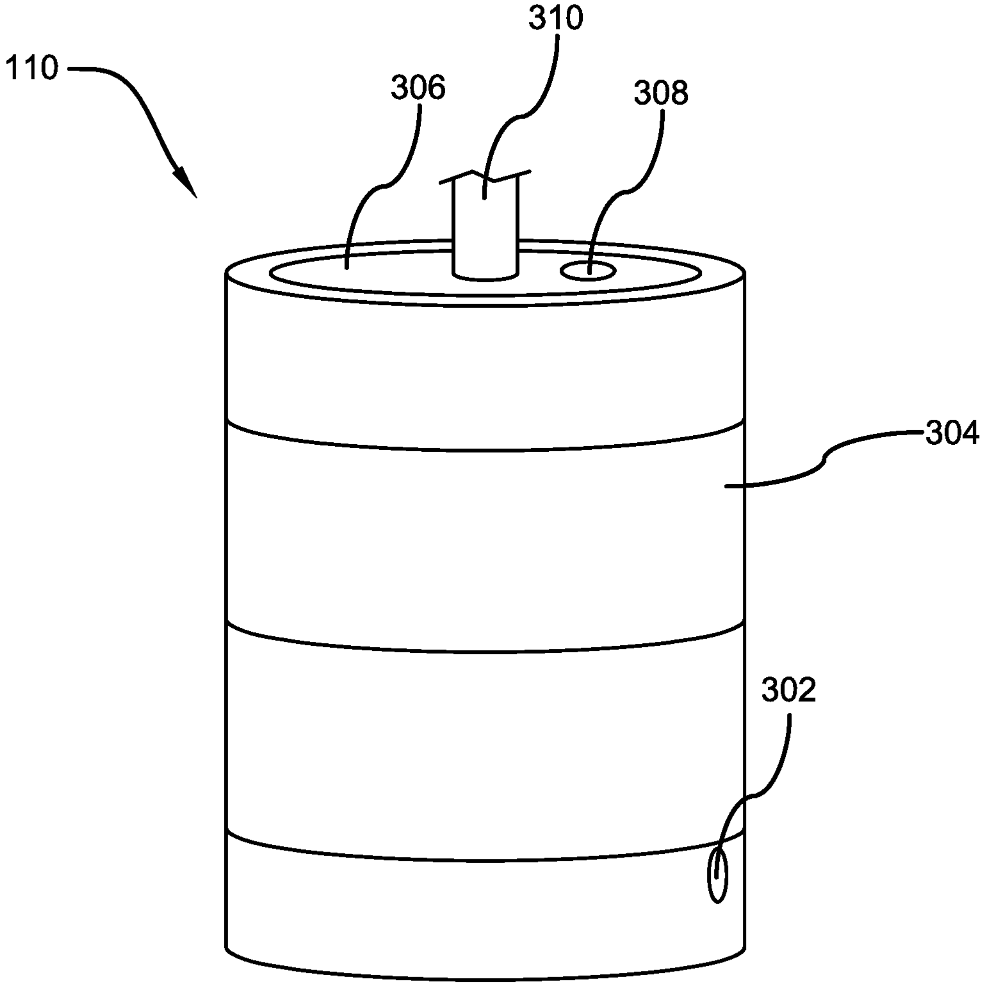
FIG. 3 illustrates a standalone view of the vacuum drum of the grain vacuuming device of the present invention in accordance with the disclosed structure.

FIG. 3 illustrates a standalone view of the vacuum drum 110 of the grain vacuuming device of the present invention in accordance with the disclosed structure. The flexible pipe 114 for collecting grains is detachably attached to the inlet hole 302 which can be positioned at any appropriate place on the housing 304 of the drum 110. The housing 304 can be made of stainless steel, aluminum, fiberglass reinforced plastics, polyethylene, or polypropylene. A removable lid 306 is used to remove the collected grains from the drum 110 using any conventional automatic or manual method. Also, an outlet hole 308 is disposed in the removable lid 306 for enabling the air compressor 106 to be used for retrieving all the stored grains. For creating vacuum and suction, the air compressor 106 is coupled to the drum 110 via the suction opening 310.

Figure 4:
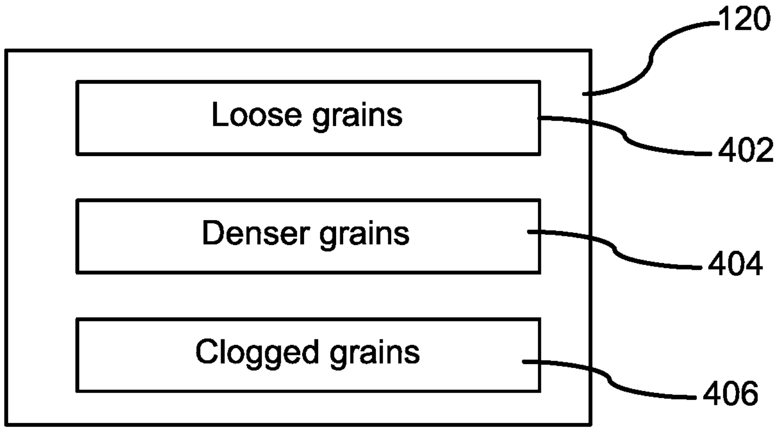
FIG. 4 illustrates an enlarged view of the control module showing options for vacuuming different types of grains in accordance with one embodiment of the present invention.

FIG. 4 illustrates an enlarged view of the control module 120 showing options for vacuuming different types of grains in accordance with one embodiment of the present invention. As illustrated, the control module 120 includes different options for maintaining the optimal pressure for vacuuming grains. "Loose grains" option 402 can automatically provide pressure in the range of 70 to 240 millibars (mbar) for light grains such as rice, oats, and more. "Denser grains" option 404 can automatically provide pressure in the range of 240 to 480 millibars (mbar) for grains such as corn, barley, and soybeans. Similarly, "Clogged grains" option 406 can automatically provide pressure in the range of 320 to 580 millibars (mbar) for vacuuming clogged grains. The options can be in the form of physical buttons, touch buttons, toggle buttons, and any other actuation buttons.

Figure 5:
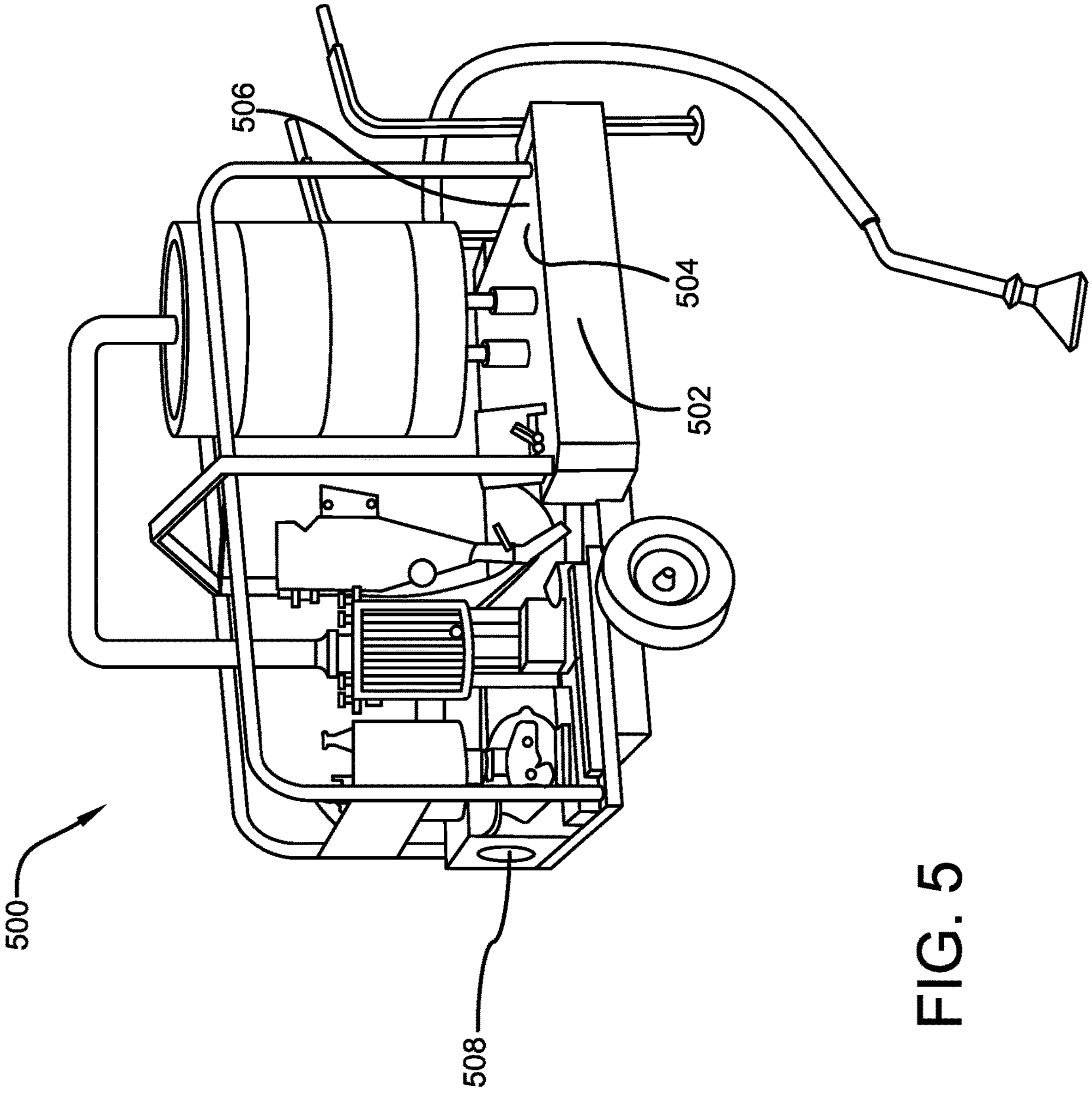
FIG. 5 illustrates another embodiment of the trailer-mounted grain vacuum device of the present invention in accordance with the disclosed architecture.

FIG. 5 illustrates another embodiment of the trailer-mounted grain vacuum device of the present invention in accordance with the disclosed architecture. In the present embodiment, the trailer-mounted vacuum device 500 is fixed to a trailer 502 wherein the trailer 502 is compact in size and is manually maneuvered by an operator. The device 500 has a structure similar to the vacuum device 100 of FIG. 1 but is of lesser power and is integrated into the trailer 502. The top surface 504 of the trailer 502 has solar panels 506 placed thereon to recharge the power source 508 for providing electrical power to the vacuum device 500.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "trailer-mounted grain vacuum device", "trailer-mounted loose grain vacuum device", "trailer-mounted vacuum device", and "vacuum device" are interchangeable and refer to the trailer-mounted grain vacuum device 100, 500 of the present invention.

Notwithstanding the foregoing, the trailer-mounted grain vacuum device 100, 500 of the present invention can be of any suitable size and configuration as is known in the art without affecting the overall concept of the invention, provided that it accomplishes the above stated objectives. One of ordinary skill in the art will appreciate that the trailer-mounted grain vacuum device 100, 500 as shown in the FIGS. 1-5 are for illustrative purposes only, and that many other sizes and shapes of the trailer-mounted grain vacuum device 100, 500 are well within the scope of the present disclosure. Although the dimensions of the trailer-mounted grain vacuum device 100, 500 are important design parameters for user convenience, the trailer-mounted grain vacuum device 100, 500 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim

What is claimed is:

1. A trailer-mounted vacuum device comprising:
- a power generator;
- an air compressor;
- an air storage tank;
- a grain storage tank; and
- a hydraulic hoist;
- wherein said power generator is integrated with said vacuum device and is used for providing the electrical power to said vacuum device;
- wherein said air compressor and said air storage tank creating high-pressure airflow for creating a vacuum effect in said vacuum device;
- wherein said high-pressure airflow creating a suction force for collecting grains into said grain storage tank; and
- further wherein said hydraulic hoist selectively positions a height of said grain storage tank for accommodating different grain collection scenarios.

2. The trailer-mounted vacuum device of claim 1, wherein said hydraulic hoist selectively positions an angle of said grain storage tank for accommodating said different grain collection scenarios.

3. The trailer-mounted vacuum device of claim 1 further comprising a flexible vacuum pipe selectively attached to said grain storage tank for the collecting of grains.

4. The trailer-mounted vacuum device of claim 3, wherein said grain storage tank is a sealed chamber having a pressure inside said grain storage tank lower than the surrounding atmospheric pressure.

5. The trailer-mounted vacuum device of claim 4, wherein said air compressor pumps stored air into said air storage tank, and further wherein said stored air is stored under pressure in said air storage tank.

6. The trailer-mounted vacuum device of claim 5, wherein said stored air creates a vacuum effect inside said grain storage tank and a suction effect along said flexible vacuum pipe.

7. The trailer-mounted vacuum device of claim 6 further comprising a hoist pedal electronically connected to said grain storage tank for adjusting the height of said grain storage tank.

8. The trailer-mounted vacuum device of claim 7, wherein said trailer-mounted vacuum device having a pressure monitoring module for monitoring a pressure level inside said air storage tank and said grain storage tank.

9. The trailer-mounted vacuum device of claim 8, wherein said pressure monitoring module controls release of said stored air at a predetermined pressure level.

10. The trailer-mounted vacuum device of claim 9, wherein said power generator is selected from the group consisting of a gasoline generator, a diesel generator, a propane generator, a natural gas generator, a solar generator, and a wind generator.

11. The trailer-mounted vacuum device of claim 9 further comprising a control module for controlling said pressure level and for vacuuming different types of grains, wherein said control module having at least three options for controlling said pressure level.

12. The trailer-mounted vacuum device of claim 11, wherein said at least three options are selected from the group consisting of a first pressure level range from 70 millibars to 240 millibars, a second pressure level range from 240 millibars to 480 millibars, and a third pressure level range from 320 millibars to 580 millibars.

13. The trailer-mounted vacuum device of claim 1, wherein said hydraulic hoist having a plurality of hydraulic cylinders including piston and rod assemblies, and further wherein each said plurality of hydraulic cylinders having a hydraulic reservoir for holding hydraulic fluid to transmit fluid pressure to each said plurality of hydraulic cylinders.

14. A trailer-mounted vacuum device comprising:
- a power generator;
- an air compressor;
- an air storage tank having a pressure level therein;
- a grain storage tank;
- a hydraulic hoist for selectively positioning a height and an angle of said grain storage tank for accommodating different grain collection scenarios; and
- a control module;
- wherein said power generator is integrated with said vacuum device and is used for providing the electrical power to said vacuum device;
- wherein said air compressor and said air storage tank creating high-pressure airflow for creating a vacuum effect in said vacuum device;
- wherein said high-pressure airflow creating a suction force for collecting grains into said grain storage tank;
- wherein said control module controls said pressure level for vacuuming different types of grains;
- wherein said control module having at least three options for controlling said pressure level; and
- further wherein said at least three options are selected from the group consisting of a first pressure level range from 70 millibars to 240 millibars, a second pressure level range from 240 millibars to 480 millibars, and a third pressure level range from 320 millibars to 580 millibars.

15. The trailer-mounted vacuum device of claim 14 further comprising a flexible vacuum pipe selectively attached to said grain storage tank for the collecting of grains.

16. The trailer-mounted vacuum device of claim 14, wherein said grain storage tank is a sealed chamber having a pressure inside said grain storage tank lower than the surrounding atmospheric pressure.

* * * * *